July 1, 1941.　　　　J. G. HAWLEY　　　　2,247,374
BRAKE
Filed Aug. 15, 1934　　　　3 Sheets-Sheet 1

Inventor
Jesse G. Hawley,
By Albert T. St Clair
Attorney

July 1, 1941.  J. G. HAWLEY  2,247,374
BRAKE
Filed Aug. 15, 1934  3 Sheets-Sheet 2

Inventor
Jesse G. Hawley,
By Albert T. St Clair
Attorney

July 1, 1941.  J. G. HAWLEY  2,247,374
BRAKE
Filed Aug. 15, 1934  3 Sheets-Sheet 3
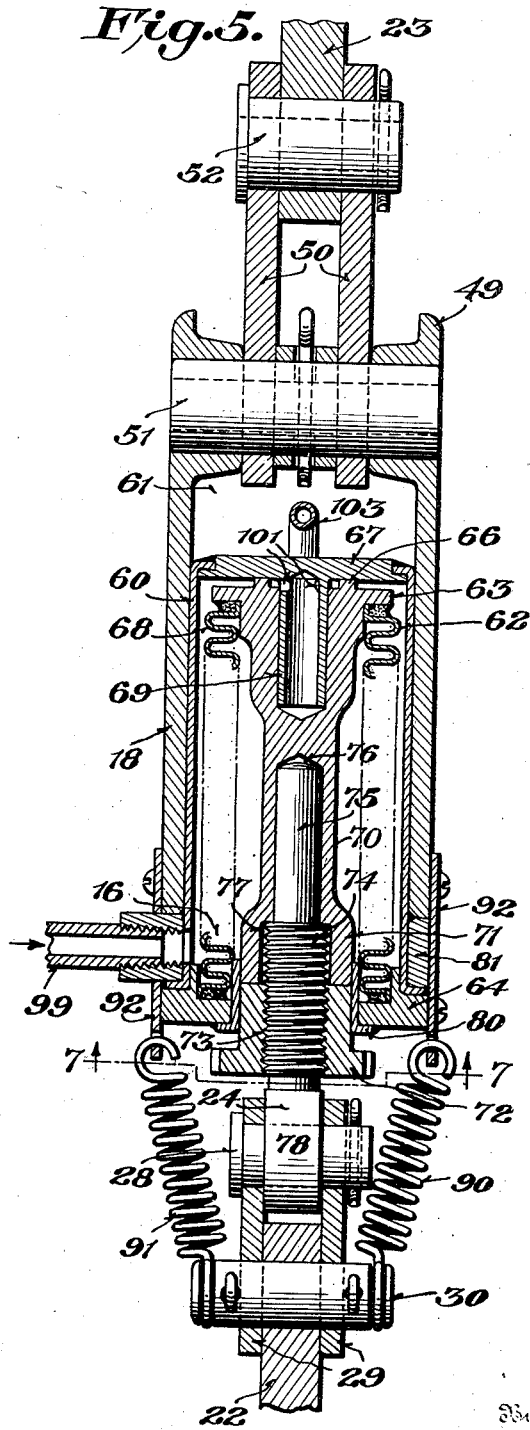
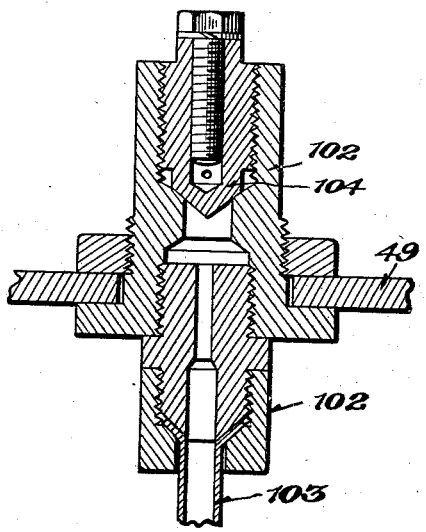
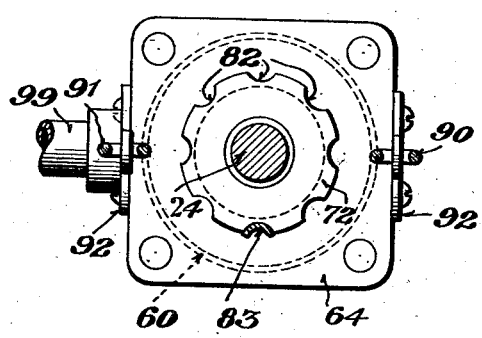
Inventor
Jesse G. Hawley,
By Albert T. St Clair
Attorney Patented July 1, 1941

2,247,374

UNITED STATES PATENT OFFICE 2,247,374

BRAKE

Jesse G. Hawley, Painted Post, N. Y., assignor to Hawley-Jones Corporation, Riverside, N. Y., a corporation of New York Application August 15, 1934, Serial No. 739,850

1 Claim. (Cl. 188—152)

This invention relates to the art of brakes, and more particularly to internally expanding brakes.

Prior brakes have generally been characterized by relatively complicated mechanism, including a fixed brake lining and a relatively fixed brake shoe, which resulted in overheating, improper centering of the brake sections, irregular wear on the brake lining, slow release, and difficult replacement of the brake lining.

My present invention, which is an improvement on the brake set forth and claimed in my application Serial No. 590,481, filed February 2, 1932, and which became Patent No. 2,098,660, and in my application Serial No. 698,783, filed November 20, 1933, and which became Patent No. 2,174,243, is particularly adapted for airplane use and overcomes the above defects by providing a diaphragm actuated brake with a creeping brake lining and a full floating brake shoe provided with a special swinging anchor.

It is therefore an object of this invention to provide a new and improved brake.

It is another object to provide a brake with a full floating brake shoe and a creeping brake lining.

It is a further object to provide a brake in which a full floating expanding brake shoe has a special anchor.

It is also an object to provide an improved hydraulic brake.

It is a further object to provide an improved hydraulic actuating mechanism.

With the above and other objects in view, which will be apparent as the description proceeds, I have set forth my invention in the following specification and have illustrated it in the accompanying drawings, in which:

Fig. 5 is a longitudinal section through the hydraulic actuating mechanism and adjacent parts, on the lines 5—5 of Figs. 2 and 4;

Fig. 6 is a horizontal section through the bleeder on the line 6—6 of Fig. 4; and Fig. 7 is a transverse section on the line 7—7 of Fig. 5, showing the diaphragm adjusting nut and adjacent parts.

Figure 2:
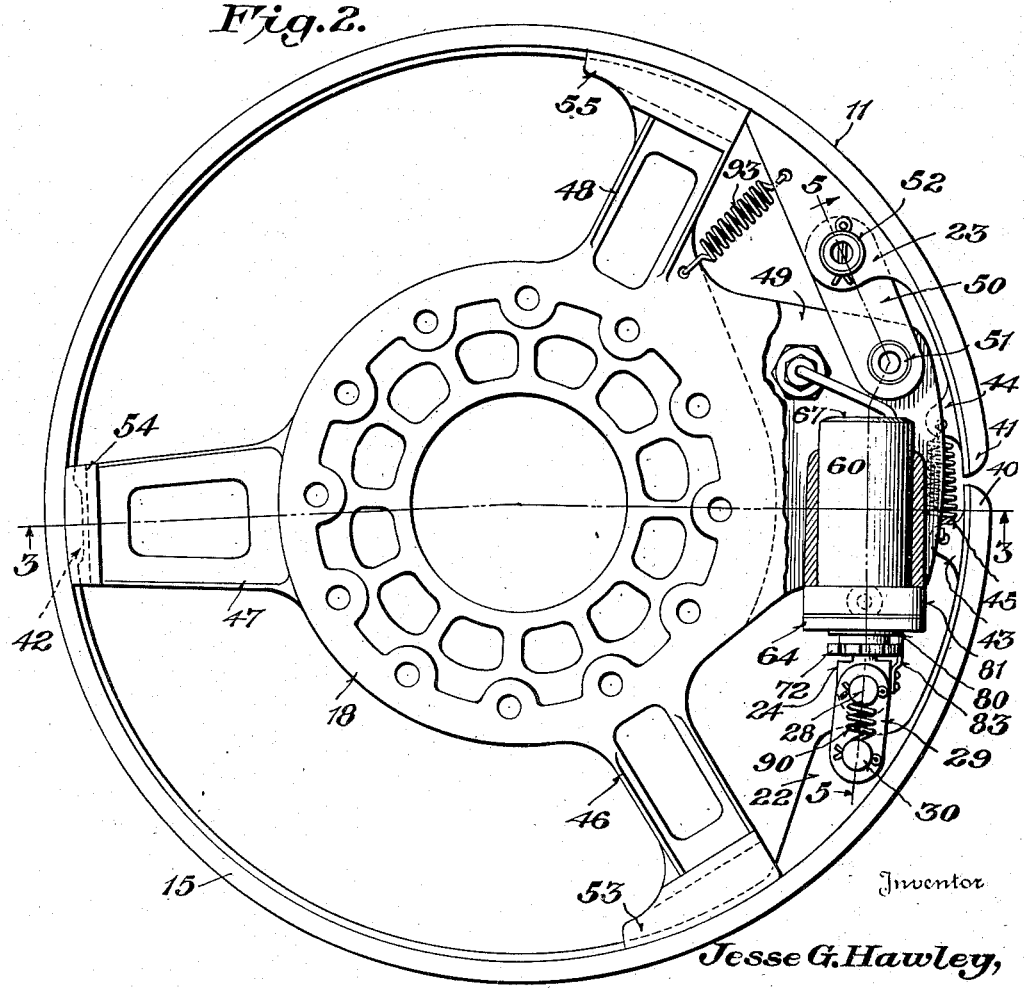
Fig. 2 is a side elevation of my brake shoe and its related parts with a portion of the spider broken away.
Figure 3:
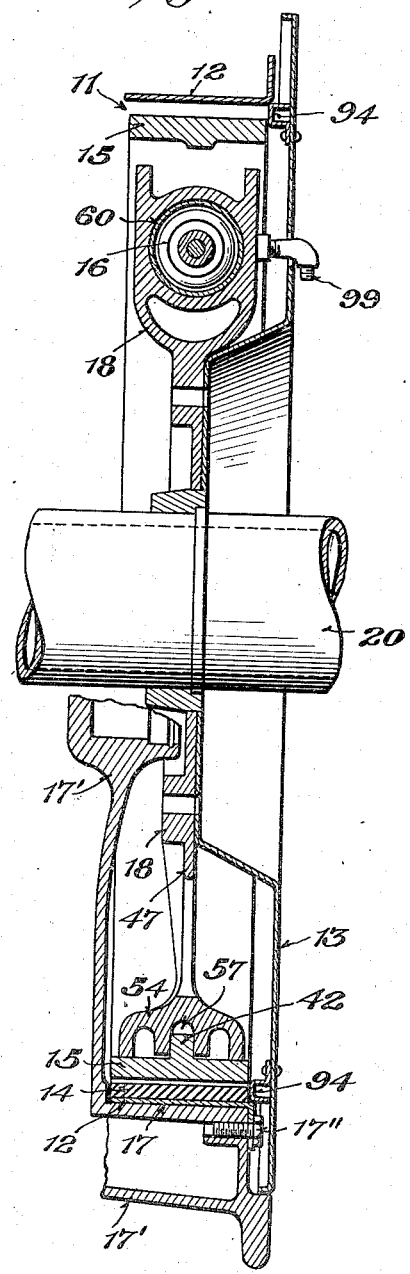
Fig. 3 is a horizontal transverse section, on the lines 3—3 of Figs. 1 and 2, showing the relation of the wheel, drum, brake lining, brake shoe, spider, hydraulic actuating mechanism, and lining retainer.

Referring to the accompanying drawings, and particularly to Figs. 2 and 3, my brake 11 preferably comprises a drum 12, a fixed brake cover 13, a creeping brake lining 14, a full floating brake shoe 15, and a diaphragm mechanism 16 for expanding the brake shoe into contact with the brake lining when the brake is to be applied.

In the embodiment of my invention shown herein, which is particularly adapted for use on airplane wheels, although it is not limited thereto, the drum 12 may be of any desired construction although it is here shown as a ring shaped member that is secured to the brake cavity 17 of a wheel 17' by bolts 17".

My brake shoe 15 is mounted so as to have a full floating action by yieldingly connecting it with a spider 18, as described below, and the spider 18 and brake cover 13 are preferably bolted to the hub flange (not shown) of an axle 20.

The drum 12 and wheel 17' are free to turn with respect to the spider 18 and the floating brake shoe 15.

The brake shoe 15 is provided with a pair of bosses 22 and 23, and the diaphragm mechanism 16 includes an adjusting screw 24, which is pivoted at 28 to a pair of links 29 pinned to boss 22 by a stud 30.

The free ends 40 and 41 of the brake shoe are united by a retracting spring 45, which is secured to small lugs 43 and 44 near the ends 40 and 41 respectively.

The spider 18 is preferably a substantially circular cored casting provided with projections 46, 47, and 48, arranged at substantially equal intervals around its circumference, and a projecting arm 49. The latter is connected to the boss 23 by a pair of links 50, pivoted at 51 and 52 to the arm 49 and boss 23, respectively.

Projections 46, 47, and 48 terminate in spacing ends 53, 54, and 55 respectively, which are disposed in proximity to the brake shoe 15 to prevent its undue retraction during the periods when the brakes are not being applied. Furthermore, this construction prevents substantial contact between the shoe 15 and lining 14, except when the brake is applied, by maintaining the circular shape of the brake shoe, and thus preventing it from having more than a predetermined sidewise movement.

As shown, the spacing member 54 is different from the spacing members 53 and 55 by being centrally slotted at 57 to receive the boss 42, which forms a sliding guide for the spider 18.

Figure 4:
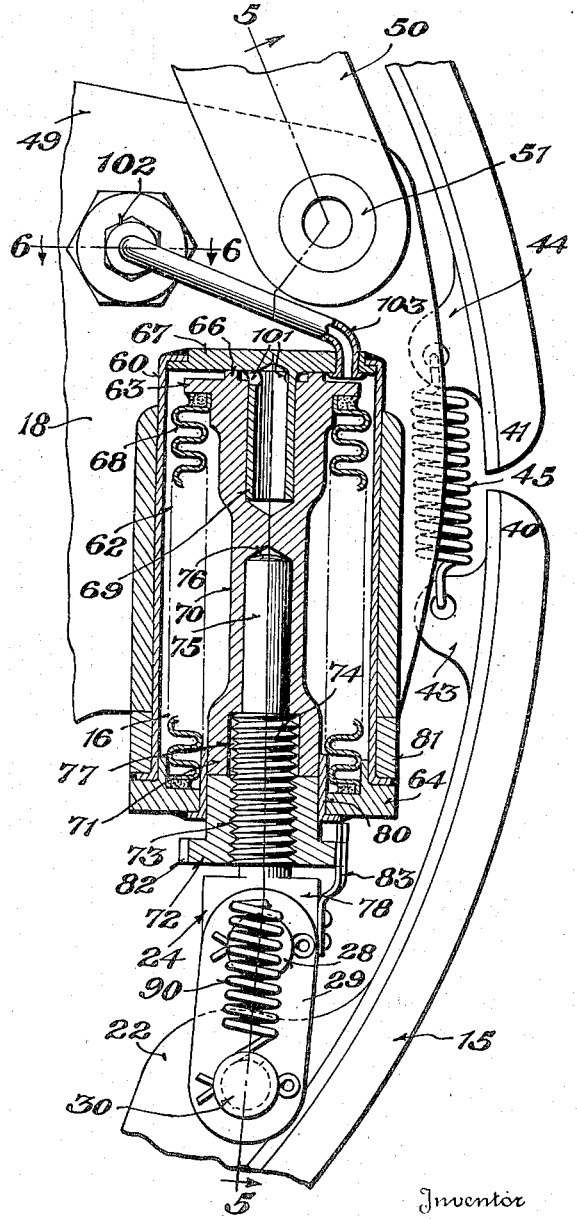
Fig. 4 is an enlarged plan view of the ends of the brake shoe and the adjacent portion of the spider, with a part of the latter broken away to show the construction of the hydraulic actuating mechanism.

As shown in Figs. 4 and 5, the diaphragm mechanism 16 for applying my improved brake comprises a cylinder 60, which is tightly mounted in a recess 61 formed in spider 18. Housed in cylinder 60 is a diaphragm 62 that is closed at its inner end by a head 63, and at its outer end is rigidly connected, as by soldering or brazing, to a head 64. The diaphragm head 63 is provided with projections 66, which normally rest against the closed end or head 67 of cylinder 60, but the main portion of the head 63 is permanently spaced therefrom to allow an actuating fluid to bear thereagainst. Similarly, the convolutions 68 of the diaphragm are spaced from the walls of the cylinder. In its movement within the cylinder, the diaphragm is guided by a hollow pin 69 carried by the cylinder head 67, and the head 63 of the diaphragm forms the inner end of a plunger 70.

The opposite end 71 of the plunger abuts against an adjusting nut 72, which is provided with a threaded recess 73 to receive a correspondingly threaded portion 74 of the adjusting screw 24, which is provided with a portion 75 of reduced diameter that is telescoped into a recess 76 in the plunger 70. At its outer end recess 76 is enlarged at 77 to freely receive part of the threaded portion 74 of the adjusting screw 24. The outer end of the adjusting screw terminates in a head 78 that is perforated to receive the pivot 28.

The adjusting nut 72 is spaced from cylinder head 64 by a sleeve 80 which is rigidly secured to the head 64 in any convenient way, as by spot welding. Cylinder head 64 is spaced from the side of arm 49 by a collar 81 with the outer end of cylinder 60 held securely between the collar 81 and cylinder head 64 in any suitable manner, as by spot welding, and with the additional aid of bolts if desired.

As shown in Figs. 2, 4, and 7, adjusting nut 72 is provided with a series of peripheral recesses 82 for selective engagement by a spring lock 83 secured to the side of head 78 of adjusting screw 24.

The projecting arm 49 on the spider is yieldingly connected to the boss 22 on the brake shoe by a pair of return springs 90 and 91, connected at one end to the stud 30 and at the opposite end to a pair of plates 92 secured to the upper and lower faces of arm 49, as best shown in Fig. 5.

As indicated in Fig. 2, boss 23, near the opposite end of the brake shoe, is yieldingly connected with the opposite side of the arm 49 on the spider by a return spring 93.

The cover 13 is preferably provided with a brake lining retaining member 94 which, as shown in Fig. 3, is bolted or otherwise secured thereto at a position which will correspond with the position occupied by the creeping brake lining 14 in the drum 12, to serve as a convenient means for preventing lateral shifting of the brake lining.

Figure 1:
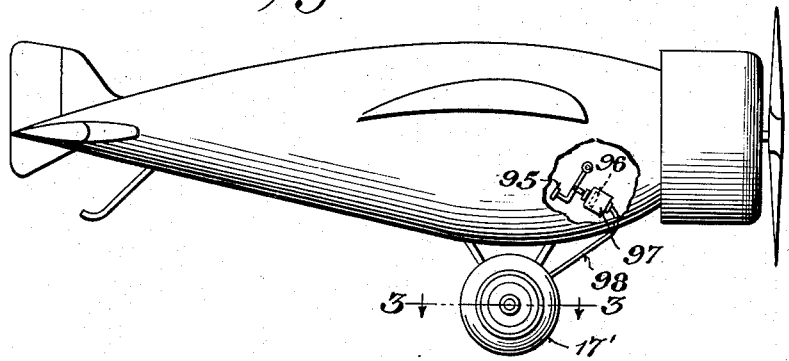
Figure 1 is a side view of an airplane embodying my invention with a portion of the body broken away to disclose the adjacent parts.

In the preferred form of my invention, as shown in Fig. 1, the vehicle is provided with a foot brake pedal 95, which is connected with a piston 96 in a master cylinder 97, preferably adjacent thereto. Said master cylinder is provided with any desired operating fluid, e. g., oil or compressed air, although I prefer to use oil (not shown), and the opposite end of the cylinder is connected with the diaphragm mechanism 16 on each wheel by flexible piping 98, which is preferably kept completely full of the operating fluid. The latter enters cylinder 60 externally of the diaphragm 62 through a nipple 99. The fluid normally fills this chamber, including the portion between the end 63 of the diaphragm mechanism and the cylinder head 67. It is also free to pass into the hollow pin 69, carried by cylinder head 67, through openings 101 therein.

When it is desired to apply the brake, the operator actuates foot brake pedal 95, which forces the piston 96 in master cylinder 97 toward the opposite end and forces the fluid out through the flexible piping 98 to the nipple 99 on the individual brake cylinder 60.

The fluid thus displaced enters the cylinder 60 and acts against the end 63 of plunger 70 to cause it to slide outwardly on the hollow pin 69 carried by the cylinder head 67, thus partially compressing the diaphragm 62. The outward movement of the end 71 of the plunger, acting against the abutting surface of the adjusting nut 72, forces the adjusting screw 24 outwardly and, since this is secured to the links 29, the end 40 of the brake shoe 15 is forced into engagement with the brake lining 14 to press it tightly against the drum 12. This initiates the wrapping action and the brake shoe is then automatically forced into contact with the brake lining throughout its entire inner surface, swinging the end 41 of the brake shoe outwardly on its pivot 51.

When the brake is released, by removing the pressure on the pedal 95, retracting spring 45, connecting the ends of brake shoe 15, withdraws the ends 40 and 41 of the brake shoe from the lining 14 and the drum 12, and return springs 90 and 91 then force the adjusting screw 24 inwardly and return the end 63 of the diaphragm mechanism to its seat against the cylinder head 67, thus forcing fluid out of the cylinder 60 and back into the master cylinder 97 through the flexible piping 98. The return swinging of the anchor links 50 on the pivot 51 is effected through the return spring 93, which connects the spider 18 with the end 41 of the brake shoe 15.

I also provide a bleeder 102 of any conventional type, connected with the cylinder 60 through a pipe 103, as shown in Figs. 4 and 6. The bleeder is provided with an adjustment valve 104 that may be opened to free the system of any air that may be contained therein, in order that the operation of the liquid fluid may not be impeded, after which the valve will again be closed tight.

Since this brake is intended primarily for use on airplanes, it is only operable in one direction, namely, the direction in which the airplane is travelling forward. This corresponds to a clockwise direction in Figs. 2 and 4.

My floating brake shoe 15 preferably comprises a single flexible band with spaced rounded ends 40 and 41, the rounding serving to provide for smoother application of the brake. I prefer to make the brake shoe of cast iron, although it can be made of spring steel or other flexible metals.

It is a particular point of my invention that the brake shoe is flexible throughout its whole length and that this flexibility is substantially uniform. To facilitate this, I prefer to make it of uniform substantially flat cross section, except for the bosses 22 and 23, the boss 42 arranged at some intermediate point, which is shown as the midway point in Fig. 2, and two small lugs 43 and 44 near the ends 40 and 41 to receive the retracting spring 45.

The entire brake shoe 15, being made of resilient material and only being anchored at the pivots 30 and 52, and with the assistance of spring 45, has a tendency when released to disengage its entire surface from the brake lining because of the above features and its free floating nature. In other words, when pressure upon the pedal 95 is released, there is nothing to maintain engagement or braking action as the whole shoe simply contracts.

Furthermore, since the brake shoe is preferably a single floating member and the brake lining is not secured to it, the characteristic clinging action of previous brakes is avoided and a quick positive release is secured. This eliminates the pronounced chattering of previous brakes when they are applied lightly, and the grabbing when they are applied quickly or savagely, and produces a smooth velvety braking action.

By being mounted in this manner the floating brake shoe will correct any slight off-center relation between the brake drum and the axle and prevent the characteristic ridging of the interior of the brake drum, which is the usual, if not universal, accompaniment of the use of a fixed brake shoe.

It is also a special feature of my invention to provide a brake with a creeping brake lining 14 which is free to creep or float in the space between the brake shoe 15 and the drum 12 during the periods between applications of the brake and while the brake is being applied or released. By providing a creeping brake lining, I avoid the overheating and the tendency to secure braking with the same zone of the brake lining at all times which are inherent in a brake having a fixed brake lining.

The creeping brake lining 14 is of any suitable type, such as the usual asbestos brake lining, but is preferably provided with a large number of metal studs extending therethrough to serve as a convenient heat transmitting medium, in order that the heat generated between the shoe, lining and drum, in applying the brake, may be transmitted to and through the drum, and dissipated into the atmosphere.

From the above discussion it will be apparent that I have provided a new and improved brake which is simple in construction and efficient in operation. The brake drum 12 may be of pressed steel or cast iron. The links may be varied in construction and single or double members may be used.

The spider 18 may be made of any desired material but is preferably an aluminum alloy sold under the trade name "Lynite."

The brake cover 13 is also preferably made of aluminum.

It will also be apparent that, by means of my floating brake shoe 15, I am able to correct the almost inevitable eccentricity of the mounting of the brake shoe with respect to the brake drum and to secure a quick release of the brake, and that, by virtue of the creeping brake lining, I not only eliminate the difficulty of originally installing as well as of replacing brake linings, but the wear resulting from the application of the brake is distributed over the entire area of the brake lining instead of being limited to certain portions thereof, and that this also accomplishes the highly valuable adjunct of eliminating overheating.

Through the provision of the adjusting nut 72, it will be obvious that the normal position of the brake shoe 15 with respect to the lining 14 and drum 12 may be varied so that, if the lining becomes worn, the ends 40 and 41 of the brake shoe may be spread farther apart by merely turning the adjusting screw 72 until the desired relationship between the brake shoe and the lining and drum is obtained, after which the spring lock 83 will retain the adjusting nut in the desired position. This feature adds materially to the effective life of the brake lining.

It is a further point of my invention that the boss 23 can be placed at any desired position around the circumference of the brake in order to secure the desired energizing action, and the further it is displaced, in the direction of wrap, the greater will be the braking power secured. The shape of the spider would, of course, be changed accordingly in order to provide an arm 49 in proximity to the boss 23.

The diaphragm mechanism 16 disclosed herein is a special feature of the present invention in that it provides an effective means of securing high actuating power without the complications incident thereto in piston and cylinder operation. Furthermore, by having the actuating fluid on the outside of the convolutions 68 of the diaphragm, the latter is not distorted even under the application of exceedingly heavy pressure.

As many apparently widely different embodiments of this invention may be made without departing from the spirit thereof, it is to be understood that I do not limit myself to the foregoing embodiments or description except as indicated in the following patent claim.

I claim:

In a brake, the combination of a brake shoe provided with a boss near each end thereof, a fixed spider, a diaphragm mechanism connecting the spider and one of said bosses, a pivoted link positively connecting said spider with said other boss, a plurality of spaced means carried by the spider for preventing undue contraction of the shoe, and means for maintaining the spider in lateral alignment with the brake shoe without restricting rotary movement therebetween.

JESSE G. HAWLEY.